United States Patent
Eggleton et al.

(10) Patent No.: US 6,608,952 B2
(45) Date of Patent: Aug. 19, 2003

(54) FIBER APPARATUS AND METHOD FOR MANIPULATING OPTICAL SIGNALS

(75) Inventors: Benjamin John Eggleton, Summit, NJ (US); Arturo Hale, New York, NY (US); Charles Kerbage, Berkeley Heights, NJ (US); Robert Scott Windeler, Annandale, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/929,989

(22) Filed: Aug. 15, 2001

(65) Prior Publication Data

US 2003/0035631 A1 Feb. 20, 2003

(51) Int. Cl.$^7$ .............. G02B 6/26; G02B 6/16
(52) U.S. Cl. .................................... 385/43
(58) Field of Search ................. 385/43, 39, 123, 385/125

(56) References Cited

U.S. PATENT DOCUMENTS

| | | | |
|---|---|---|---|
| 5,572,618 A | 11/1996 | DiGiovanni et al. | 385/141 |
| 5,768,462 A | 6/1998 | Monte | 385/123 |
| 5,970,197 A * | 10/1999 | Pavlath | 385/123 |
| 6,041,149 A | 3/2000 | Monte | 385/2 |
| 6,134,356 A | 10/2000 | Monte | 385/2 |
| 6,144,779 A * | 11/2000 | Binkley et al. | 385/8 |
| 6,181,466 B1 * | 1/2001 | Franzoso et al. | 359/341.3 |
| 2002/0081055 A1 * | 6/2002 | Painter et al. | 385/2 |

* cited by examiner

Primary Examiner—Michael C. Zarroli
(74) Attorney, Agent, or Firm—John M. Harman

(57) ABSTRACT

Embodiments of the invention include an optical fiber device such as a modulator, variable attenuator or tunable filter including an optical fiber having a core region, a cladding layer around the core region, and a controllable active material disposed in, e.g., capillaries or rings formed the cladding layer. The active materials include, e.g., electro-optic material, magneto-optic material, photorefractive material, thermo-optic material and/or materials such as laser dyes that provide tunable gain or loss. The application of, e.g., temperature, light or an electric or magnetic field varies optical properties of the active material, which, in turn, varies or affects the propagation properties of optical signals in the device. The optical device includes a tapered region that causes the core mode to spread into the cladding region and, simultaneously, allows the active material to be relatively close to the propagated modes, thus allowing interaction between the active material and the propagating modes.

25 Claims, 6 Drawing Sheets

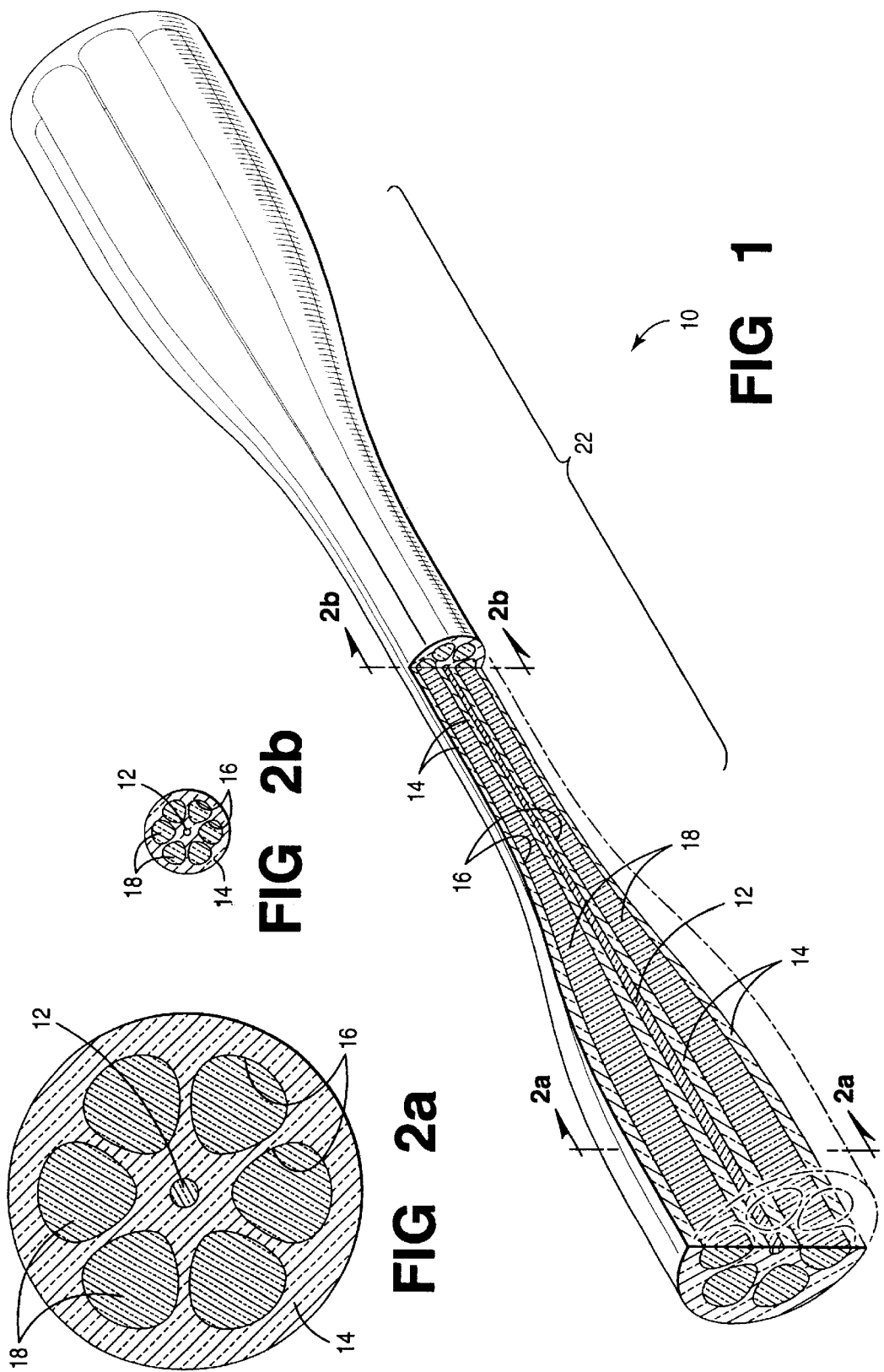

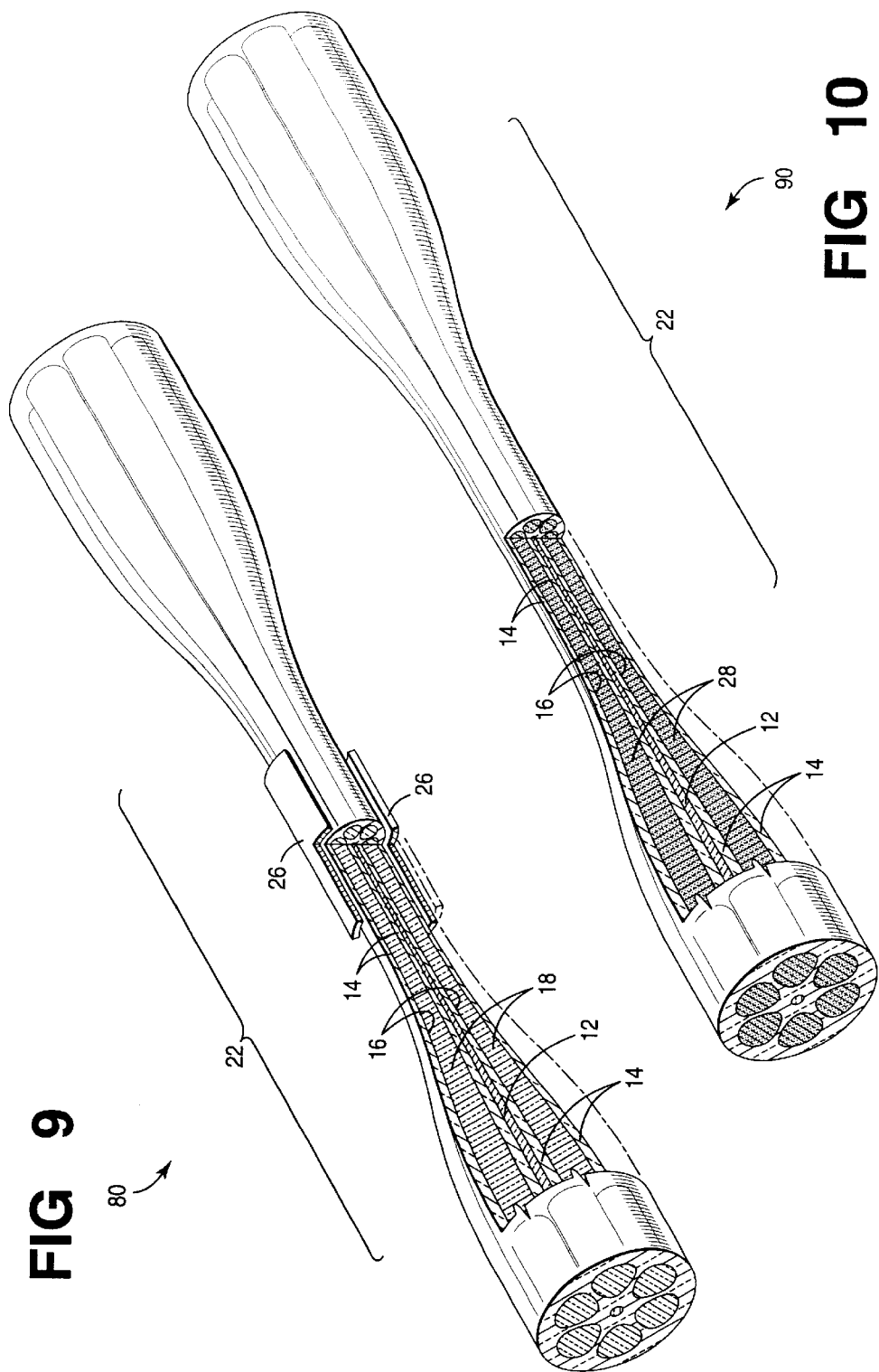

FIBER APPARATUS AND METHOD FOR MANIPULATING OPTICAL SIGNALS

FIELD OF THE INVENTION

The invention relates to optical fiber devices and methods for manipulating optical signal strength and systems using such devices and methods. More particularly, the invention relates to all-fiber optical devices, methods, and systems for modifying propagation properties of optical information.

BACKGROUND OF THE INVENTION

Optical devices that modify the properties of optical signals include devices such as modulators and attenuators. Such devices use various means to vary refractive properties of one or more regions of the device to change the amplitude/phase of a signal propagating through the device. Conventional devices of this kind use lithium niobate, electroabsorption and/or other configurations to affect the propagation properties of an optical fiber or other waveguide arrangement. Typically, conventional modulators and similar devices are relatively costly and bulky devices that introduce an undesirable amount of loss. However, conventional all-fiber modulators attempt to establish compatibility with other fibers and provide lower insertion loss and relatively compact size.

Many conventional all-fiber modulators and attenuators include devices based on fiber arrangements having a segment of the core vulnerable to an electro-optic polymer. Such devices include, e.g., D-fiber, manufactured by KVH Industries, Inc. See, e.g., U.S. Pat. Nos. 5,768,462, 6,041, 149, and 6,134,356, in which one or more grooves for positioning electrodes therein are formed in the protective (buffer) layer surrounding the core and cladding regions of the optical fiber. However, the configuration of such devices makes them relatively difficult to manufacture. Also, such devices are asymmetric, with undesirable associated polarization properties.

Other conventional modulating devices, e.g., variable optical attenuators, use micro-electromechanical systems (MEMS) technology, which often is unreliable. Also, many conventional attenuators use planar waveguide technology and/or polymers. However, such conventional devices are relatively large in size, introduce a relatively large amount of loss to an optical system, and exhibit relatively significant polarization dependence.

Accordingly, it is desirable to have available an all-fiber, optical device such as an optical modulator or variable optical attenuator that has greater performance efficiency, easier manufacturability, and generally is smaller in size than conventional modulators and attenuators.

SUMMARY OF THE INVENTION

The invention is embodied in an optical fiber device such as a modulator, variable optical attenuator or tunable filter, a system for use therein, and method for making the optical device. The optical device includes a length of optical fiber having a core region and a cladding layer formed around the core region. The cladding layer includes controllable active material disposed therein, e.g., in capillaries, pockets or rings formed in the cladding layer. The active materials include, e.g., electro-optic material, magneto-optic material, photorefractive material, thermo-optic material, and/or materials that provide tunable gain or loss (e.g., laser dyes or composite materials such as polymers dispersed with erbium particles). The application of, e.g., temperature, light (optical field) or an electric or magnetic field varies optical properties such as refractive index, loss, scattering, or birefringance of the active material, which, in turn, varies or affects the propagation properties of optical signals in the device.

The optical device also includes a tapered region that reduces the diameter of the fiber device but maintains the relative dimensional proportions as in the non-tapered regions. In the tapered region, the mode field is not supported by the doped core and spreads into the cladding region, where it interacts with the active materials. Simultaneously, the tapered region allows the active material to be physically closer to the propagated modes compared to conventional arrangements, thus allowing interaction between the active material and the propagating modes. The tapered region also is designed such that the fiber easily can be spliced to conventional fiber.

BRIEF DESCRIPTION OF THE DRAWINGS

In the drawings:

FIG. 1 is a side, partial cross-sectional view of an optical fiber device according to an embodiment of the invention;

FIG. 2a is a cross-sectional view of the optical fiber device taken along the lines 2a—2a of FIG. 1;

FIG. 2b is a cross-sectional view of the optical fiber device taken along the lines 2b—2b of FIG. 1;

FIG. 6b is a cross-sectional view of a tapered region of the alternative optical fiber of FIG. 6a;

FIG. 9 is a simplified schematic diagram of an optical fiber device according to an embodiment of the invention having an electro-optic active material;

FIG. 10 is a simplified schematic diagram of an optical fiber device according to an embodiment of the invention in which the active material is a dye laser gain medium;

DETAILED DESCRIPTION

Figure 3:
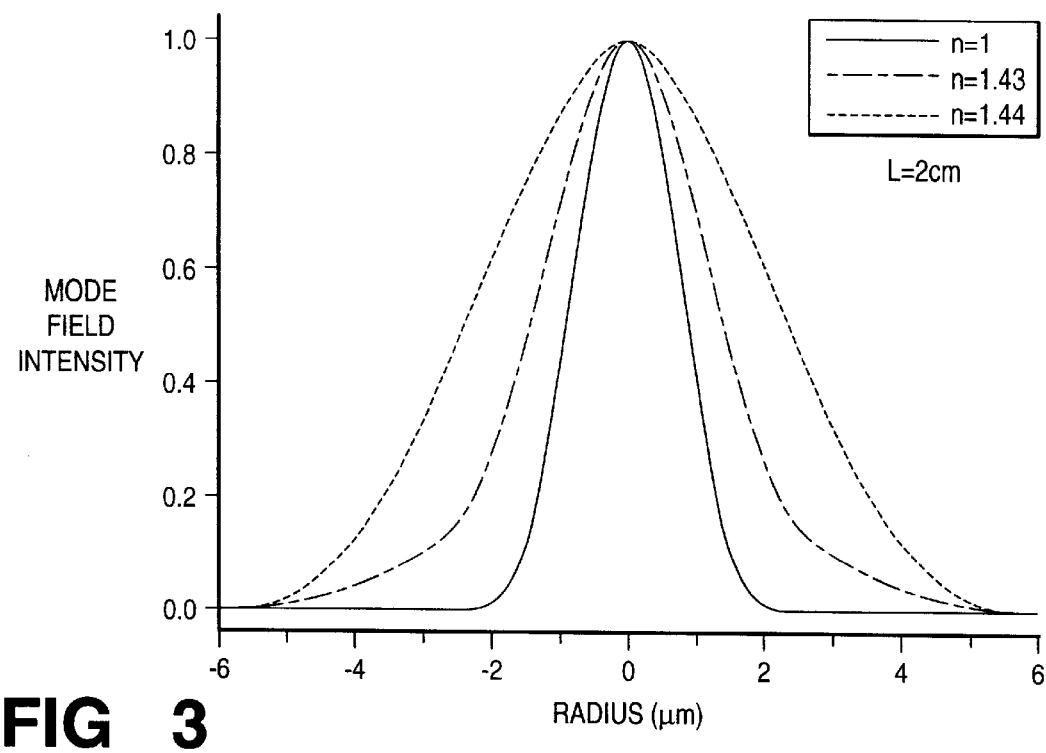
FIG. 3 is a graphical diagram of the mode field intensity across optical fibers according to embodiments of the invention for active material that has an index of refraction lower than that of silica.

In the following description similar components are referred to by the same reference numeral to enhance the understanding of the invention through the description of the drawings. Also, unless otherwise explicitly specified herein, the drawings are not drawn to scale.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a side, partial cross-sectional view of an optical fiber device 10 according to embodiments of the invention. The optical fiber device 10 includes an optical fiber comprised of a core or core region 12 surrounded by a cladding region or layer 14. The core region 12 is made of, e.g., silica (i.e., silicon dioxide, $SiO_2$) doped with germanium or other suitable material. The cladding layer 14, which has a refractive index less than that of the core region 12, typically is made of silica or silica doped with fluorine or other suitable material. The optical fiber is, e.g., an air-silica, microstructured (MF) fiber.

Multimode fiber supports many different modes (paths) of a particular wavelength, whereas singlemode fiber is designed to support only the fundamental mode ($LP_{01}$) of a particular wavelength. For multimode fiber, the diameter of the core region typically is approximately 50 or approximately 62.5 $\mu$m; for singlemode fiber, the diameter of the core region typically is less than approximately 10 microns ($\mu$m), e.g., 5–8 $\mu$m. For both singlemode and multimode fibers, the total diameter of the cladding layer 14 surrounding the core region 12 typically is approximately 125 $\mu$m. Typically, the cladding layer 14 is covered, for protection and strength, with one or more coating or buffer layers (not shown), resulting in a total outer diameter of approximately 250–1000 $\mu$m.

According to embodiments of the invention, the fiber device 10 includes active material formed or otherwise disposed in the cladding layer 14. For example, the cladding layer 14 includes one or more capillaries, voids or pockets 16 having active material (shown as 18) infused or otherwise disposed therein. Alternatively, the active material is disposed in one or more rings or layers (not shown) formed in the cladding layer 14. As will be discussed in greater detail hereinbelow, the active material 18 varies the optical properties of optical signals propagating through the optical device 10. For example, the active material 18 is a controllable material whose refractive index can be varied to affect, e.g., the signal strength of optical information propagating through the fiber device 10.

The capillaries typically are formed at the preform stage. For example, according to a method often referred to as the "stack and draw" method, silica tubes, rods and core rods are bundled into a close-packed arrangement, and the assembly is overclad to obtain the desired dimensions. The preform then is drawn into a fiber in such a way that the capillaries remain open by air pressure inside them, while unwanted holes are kept purged open so surface tension causes them to collapse. Other methods to form the capillaries in the preform are possible, e.g., sol-gel methods. Other methods to draw the preforms with capillaries also are available, e.g., the "cane" method, in which the preform is drawn into fiber in two high-tension steps; if the draw tension is much higher than the surface tension, hole collapse is prevented.

According to embodiments of the invention, the fiber device 10 also includes a tapered region or portion 22 having a diameter less than the diameter of the area of the fiber device 10 that is not tapered. For example, the diameter of the cladding layer 14 in the tapered region is approximately 10 $\mu$m, compared to a conventional cladding layer diameter of approximately 125 $\mu$m. The tapered region 22 improves the efficiency of the interaction between the active material 18 and the mode(s) propagating through the optical fiber device 10, thus improving the modulation, attenuation, suppression, filtering and/or other operation of the fiber device 10.

The active material 18 is introduced into the capillaries 16 of the device 10 preferably as a liquid. One way of introducing the active material 18 into the capillaries 16 is by immersing one end of the fiber device 10 into the liquid, and applying vacuum on the other end of the fiber device 10. Alternately, the is forced into the capillaries 16 by using positive pressure. Once the active material 18 is inside the capillary, the active material 18 typically is left as a liquid (e.g., in the case of liquid crystals) and permanently sealed inside the fiber device 10 by plugging the capillaries 16 with a sealant or collapsing the capillaries 16 with heat.

Alternatively, the active material 18 is introduced as a liquid comprising polymerizable monomeric units. These monomeric units polymerize inside the capillaries 16 and are activated, e.g., by UV or visible light, by heat, or at room temperature as a result of mixing two or more reactive components. Once polymerized, the active material 18 is permanently trapped inside the capillaries 16. Yet another alternative is to introduce a solid active material (such as a polymer) as a liquid solution in a suitable solvent, in such a way that the solid material deposits inside the walls of the capillaries 16. The solvent then is removed, e.g., by evaporation, leaving behind a solid layer of the active material 18 deposited in the capillaries 16.

Alternatively, the active material 18 is introduced into the fiber device 10 before the fiber device 10 is drawn (i.e., at the perform stage).

Although fiber devices according to embodiments of the invention have a tapered region 22, the fiber devices 10 are otherwise dimensioned to be compatible with conventional optical fiber, e.g., standard singlemode optical fiber. For example, fiber device according to embodiments of the invention are dimensioned to be spliced to conventional optical fiber such as standard singlemode optical fiber.

Referring to FIGS. 2a–b, with continuing reference to FIG. 1, shown are cross-sectional views of the fiber device at a portion thereof that is not tapered (FIG. 2a) and at the tapered region 22 (FIG. 2b). In an embodiment of the invention, the capillaries or pockets 16 are longitudinal formations in the cladding layer 14 that are arranged, e.g., radially around the core region 12, generally as shown. Also, the pocket 16 formations typically are symmetric about the core region 12, thus improving upon conventional arrangements that are asymmetric and have undesirable attendant polarization properties. However, according to other embodiments of the invention, alternative pocket 16 formation arrangements within the cladding layer 14 are suitable.

According to embodiments of the invention, one or more active materials 18 is disposed in the pockets 16. The active material 18 alters the optical properties of optical signals propagating through the fiber device 10, e.g., by interacting with the evanescent field of the propagating mode. The active material 18 includes, e.g., electro-optic material such as polymer dispersed liquid crystals and organic non-linear materials, and/or magneto-optic material such as Europium-based magnetic materials, and/or photorefractive material such as azo compounds or stilbene derivatives, and/or thermo-optic material such as liquid crystals or polymers with sufficiently high dn/dT (where n is refractive index and T is temperature), and/or material that provides tunable gain or loss (e.g., laser dyes such as coumarins, substances containing rare-earth elements, and/or composite materials such as polymers dispersed with erbium particles), and/or other suitable material. According to embodiments of the invention, the application of an externally controlled force to the active material(s) results in changes in the optical properties, e.g., refractive index, transmission loss (e.g., by scattering), absorptivity, or birefringence, of the active material(s), which, in turn, results in changes in the propagation properties of the optical signal. In this manner, optical information propagating through the fiber device 10 is, e.g., modulated, attenuated, filtered, amplified or otherwise manipulated by the application of such externally controlled fields. Depending on the active material, operations such as attenuation are capable of being tunable.

The tapered region 22 is formed, e.g., by heating and stretching the fiber in such a way that the diameter of the fiber gets smaller. According to embodiments of the invention, other methods for forming the tapered region of the fiber device 10 are suitable. However, despite the reduced size of the tapered region 22, the refractive index profile of the fiber remains the same as in the non-tapered regions of the optical device 10. For example, in the embodiment shown in FIGS. 2a–2b, in the non-tapered regions of the optical device 10, the outer diameter is approximately 125 μm, the diameter of the core region 12 is approximately 5–10 μm, and the average diameter of the pockets 16 is approximately 40 μm. In the tapered region 22, such relative proportions remain intact: the outer diameter of the fiber device 10 is approximately 30 μm, the diameter of the core region 12 is approximately 2 μm, and the average diameter of the pockets 16 is approximately 9 μm.

According to embodiments of the invention, the tapered region 22 of the fiber device 10 improves the efficiency of the interaction between the active material 18 and the modes propagating through the fiber device 10, e.g., by reducing the distance between the core region 12 and the region containing the active material 18. For example, in the fiber device 10 arrangement shown in FIGS. 2a–b, the distance between the core region 12 and the active material(s) 18 is approximately 17 μm in the non-tapered regions, but approximately 4 μm in the tapered region 22. In the tapered region 22, the active material 18 is much closer physically to the propagated optical information, thus allowing greater interaction between the active material 18 and the evanescent field of the propagating modes, which results in greater efficiency in varying the optical properties of the propagating modes. Typically, the fiber device 10 is designed such that in the non-tapered region there is little if any interaction between the core region 12 and the region containing the active material 18.

The tapered region 22 of the fiber device 10 makes the core region 12 relatively small for purposes of supporting the mode field. Accordingly, the mode field spreads into the tapered cladding layer 14, where, according to embodiments of the invention, active material 18 is positioned. The portion of the cladding layer 14 in the tapered region 22 allows all or at least part of the mode field to penetrate into the active material 18. As discussed hereinabove, the active material 18 is capable of changing optical properties such as refractive index, which change in turn varies its effect on the mode field. Light in the mode field is manipulated by the spread of its evanescent field, which depends on the refractive index of the active material 18 interacting therewith.

For example, if the refractive index of the active material 18 is lower than that of silica, much of the mode field is confined in the cladding layer 14 and only a relatively small portion of the mode field is in the area that contains active material 18. See, e.g., FIG. 3, which graphically shows the mode field intensity as a function of fiber radius. As shown, much of the mode field propagates through the fiber device 10, i.e., within a radius of approximately 2 μm from the center of core region 12.

Figure 4:
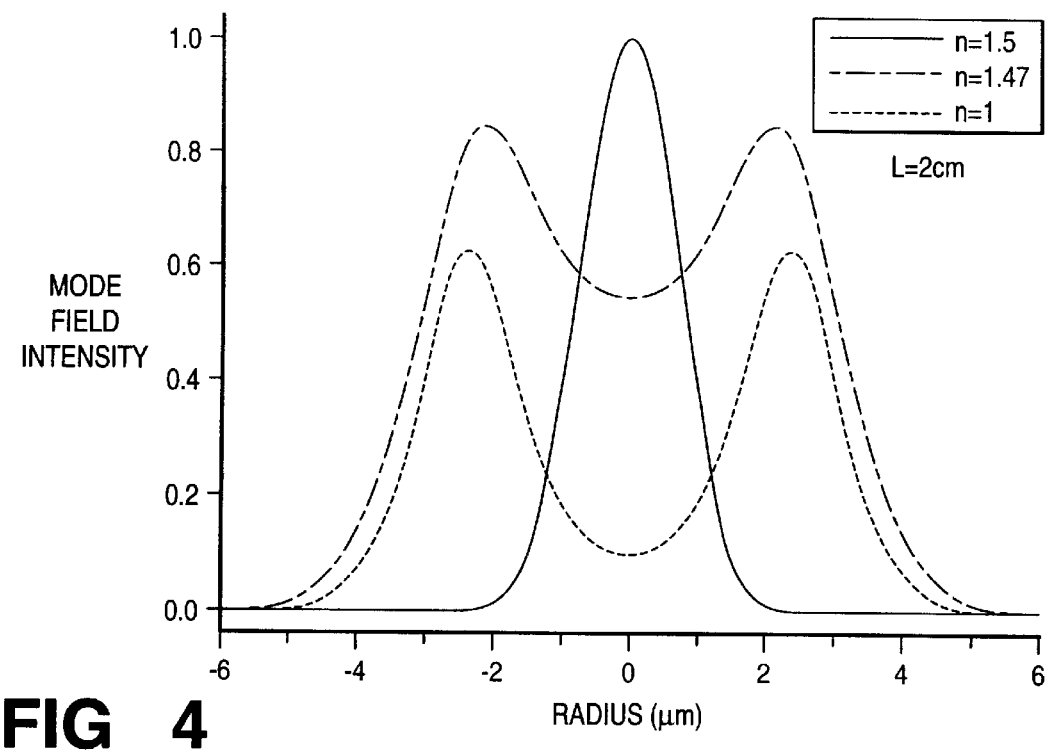
FIG. 4 is a graphical diagram of the mode field intensity across optical fibers according to embodiments of the invention for active material that has an index of refraction greater than that of silica.
Figure 5:
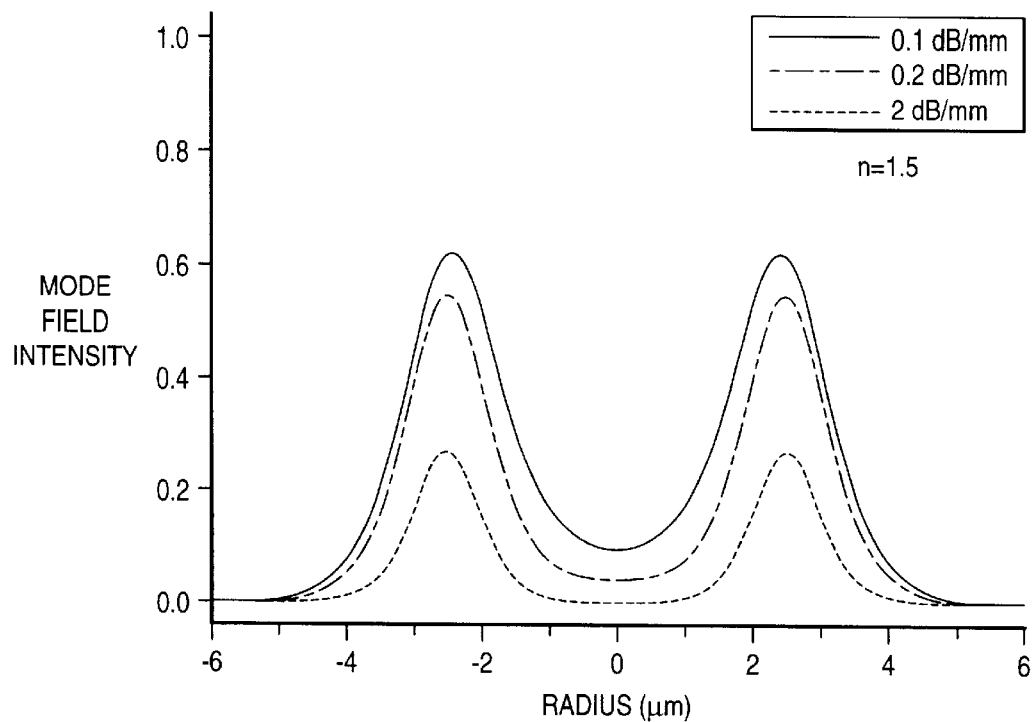
FIG. 5 is a graphical diagram of the mode field intensity across optical fibers according to embodiments of the invention for polymer active material.

Alternatively, if the index of the material is greater than that of silica, the mode field spreads out into the higher index medium (i.e., into the cladding layer 14). See, e.g., FIG. 4, which graphically shows the mode field intensity as a function of fiber radius. In such case, little of the mode field propagates through the fiber device 10. See also FIG. 5, which shows mode field intensity as a function of fiber radius for a fiber having an active material of polymer, which is inherently lossy.

In the case where the refractive index of the active material 18 is lower than that of silica, the difference between these two indices will determine how much of the mode field penetrates into active material 18. Also, the extent of this penetration can be manipulated to obtain a desired change in the output of the fiber device 10. For example, if active material 18 is lossy, this effect can be used to produce a variable attenuator.

Figure 6A:
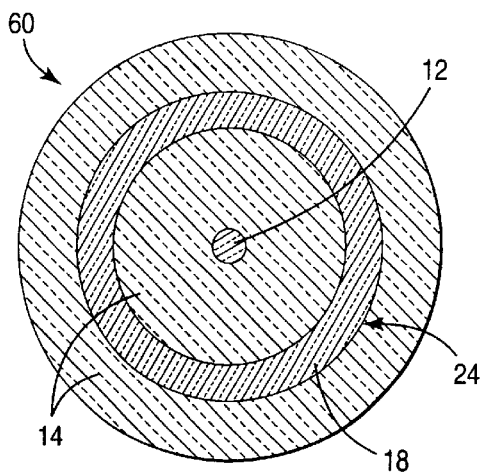
FIG. 6a is a cross-sectional view of a non-tapered region of the optical fiber according to an alternative embodiment of the invention.
Figure 6B:
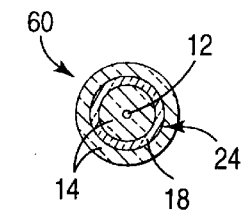

Referring now to FIGS. 6a–b, shown are cross-sectional views of an optical device 60 according to an alternative embodiment of the invention. FIG. 6a shows a cross-sectional of the fiber device 60 at a portion thereof that is not tapered; FIG. 6b shows a cross-sectional of the fiber device 60 at a portion thereof that is tapered. In this alternative embodiment of the invention, the active material 18 is disposed in one or more annular rings or layers 24 formed in the cladding layer 14. The rings 24 typically are formed at the preform stage. For example, a ring of active material, e.g., erbium, is formed into the preform. The preform is then drawn and subsequently a tapered portion thereof is formed.

Figure 7:
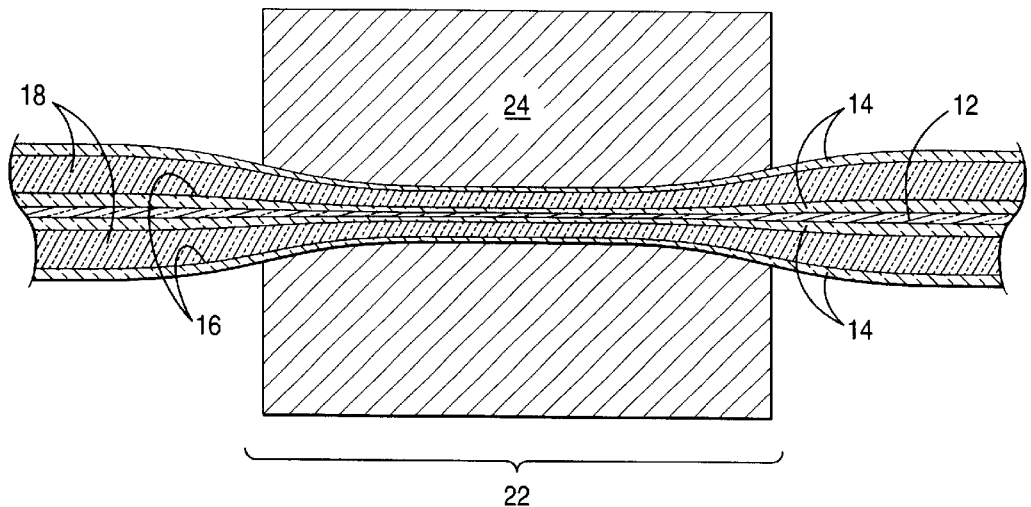
FIG. 7 is a simplified schematic diagram of an optical fiber device according to an embodiment of the invention having a thermo-optic active material.

Referring now to FIG. 7, shown is an optical device 70 according to embodiments of the invention in which the active material 18 is a thermo-optic active material. For example, the active material is a thermo-optic polymer such as a copolymer of an aliphatic acrylate and a fluoroacrylate (this material has a reasonably high dn/dT, e.g., approximately $-4 \times 10^{-4}$). The tapered region 22 is surrounded by an oven 24 or other suitable means for changing the temperature of the active material 18 (e.g., integrated thin film heaters on fiber). As discussed hereinabove, in such embodiments, heating the active material 18 affects its refractive index, which affects the optical properties of the modes propagating in the device 70.

Figure 8:
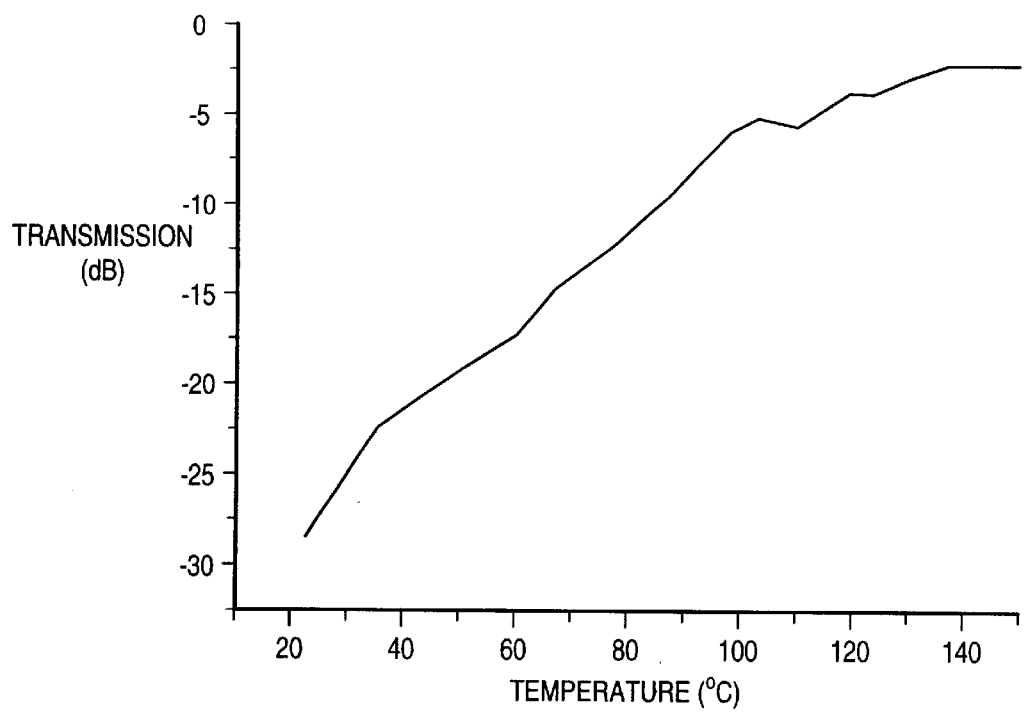
FIG. 8 is a graphical diagram of fiber transmission as a function of temperature for the optical fiber device of FIG. 7.

FIG. 8 graphically shows the transmission strength as a function of temperature for the optical fiber device 70 of FIG. 7. At relatively low temperature (e.g., 20° Celsius), the refractive index of the active material 18 is greater than or equal to that of silica. Thus, light tends to refract into the higher index active material 18 and cladding layer 14 and is not guided. Also, the inherent loss of the (polymer) active material 18 plays an additional role in the loss of the propagating mode in the fiber device 70. Conventional estimates of polymer loss in non-tapered optical fibers are on the order of approximately 1 dB/mm. As the active material 18 is heated, its refractive index becomes less than that of silica. Thus, more light tends to propagate through the optical device 70 by total internal reflection. Typical transmission loss is approximately 0.8 dB. The dynamic range is approximately 30 dB, i.e., attenuation and other suitable propagating mode manipulation operations are adjustable over a range of approximately 30 dB. The optical fiber device 60 exhibits low polarization dependence of less than 0.5 dB and relatively small wavelength dependence.

Referring now to FIG. 9, shown is an optical device 80 according to embodiments of the invention in which the active material 18 is an electro-optic active material. For example, the active material is one or more liquid crystals, or a polymer comprising mesogenic groups, or a polymer-dispersed liquid crystal (PDLC), or an organic non-linear optical material, or an electro-optic polymer, or other suitable materials that change their optical properties in response to an electric field. Some piezoelectric polymers such as polyvinylidene fluoride (PVDF) and copolymers of vinylidene fluoride and trifluoroethylene also exhibit electro-optic behavior. Also it is possible to dope these polymers with organic non-linear optical materials to enhance their electro-optic response. While materials like liquid crystals respond directly to relative low fields, organic nonlinear-optical materials require poling at high fields to align the molecules, in conjunction with a chemical or physical change during poling that permanently locks the molecules in their oriented position. Once oriented, these molecules have relatively fast electro-optic response under relatively low fields. PVDF polymers and copolymers also require poling and/or exposure to high energy beams such as electron beams or gamma rays prior to using them as electro-optic materials.

A pair of electrodes 26 are positioned near the tapered region 22 to apply an electric field to the electro-optic active material 18. To modulate the transmission of the fiber device 80, the electrodes 26 apply an electric field to the electro-optic active material 18. The change in the refractive index of the electro-optic active material 18 is given by the equation:

$$n = n_o + (½)n_o^3 rE$$

where $n_o$ is the index of the electro-optic material before applying an electric field E, and r is the electro-optic coefficient of the material.

The tapered region 22 allows the electrodes 26 to be positioned closer to the active material 18 than if the fiber device 80 did not have a tapered region 22. Accordingly, the electrodes 26 are positioned much closer to the active material 18 than they are in conventional fiber devices. For example, according to embodiments of the invention, the tapered region 22 allows the electrodes 26 to be separated within approximately 10 μm of the active material 18. In this manner, electro-optic effects are more efficient and the voltage requirements for desired electro-optic effects are lower than in conventional arrangements.

Referring now to FIG. 10, shown is an optical fiber device 90 according to an embodiment of the invention in which the active material 18 is a gain medium such as dye laser. According to alternative embodiments of the invention, optical fiber amplification devices are made by infusing or otherwise disposing, e.g., solutions such as dye laser 28 in the pockets 16 in the cladding layer 14. In such embodiments, amplification is accomplished by the interaction of the evanescent field of the guided mode with the gain medium, e.g., dye laser 28. Solutions that improve the gain amplification are chosen, e.g., based on the concentration of the solution.

Figure 11A:
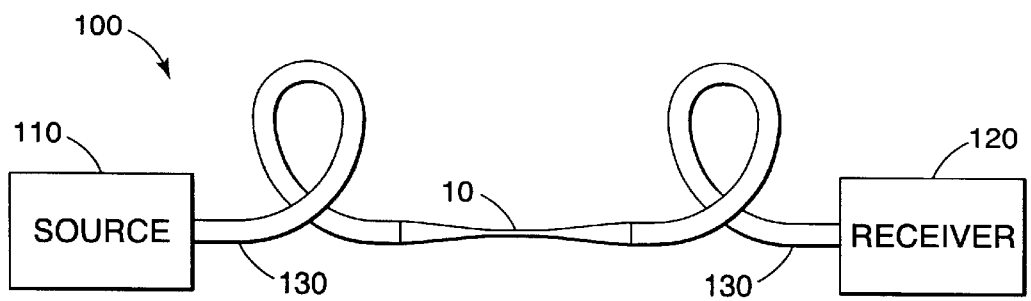
FIG. 11a is a simplified schematic diagram of an optical system in which embodiments of the invention are useful.
Figure 11B:
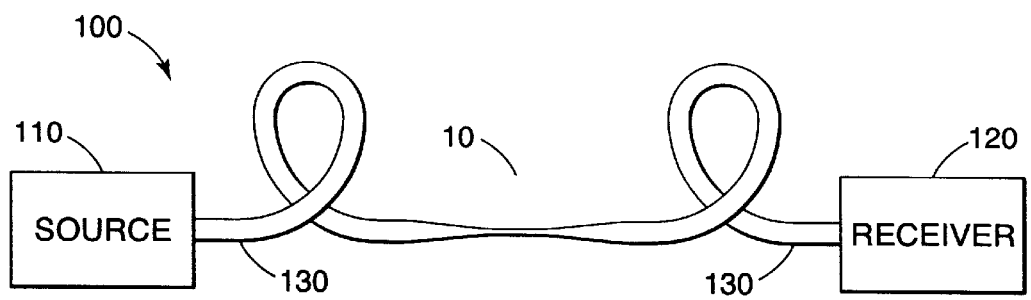
FIG. 11b is another simplified schematic diagram of an optical system in which embodiments of the invention are useful.

Referring now to FIGS. 11*a–b,* shown are simplified schematic diagrams of various system arrangements 100 in which fiber devices according to embodiments of the invention are useful. The system 100 includes one or more sources 110 for transmitting optical information, an optical transmission medium, and one or more receivers 120 for receiving the transmitted information. According to an embodiment of the invention as shown in FIG. 11*a,* the optical transmission medium includes at least one conventional fiber 130 coupled to the source 110 and at least one fiber device 10 according to embodiments of the invention, e.g., as described hereinabove. Also, e.g., at least one conventional fiber 130 is coupled between the fiber device 10 and the receiver 120. According to an embodiment of the invention as shown in FIG. 11*b,* the optical transmission medium includes at least one optical fiber or fiber device 10 coupled between the transmitter 110 and the receiver 120 and having a tapered region, e.g., as discussed hereinabove.

Figure 12:
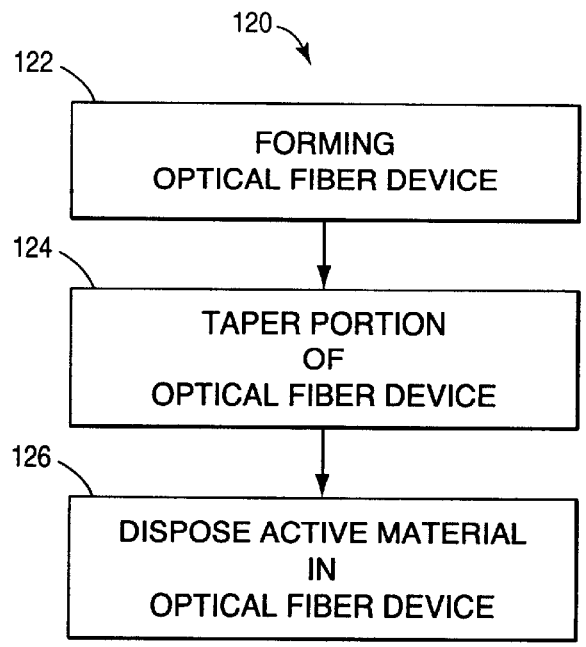
FIG. 12 is a simplified block diagram of a method for making optical fiber devices according to embodiments of the invention.

Referring now to FIG. 12, shown is a simplified block diagram of a method 120 for making optical fiber devices according to embodiments of the invention. The method 120 includes a step 122 of forming an optical fiber device having a core region, a cladding layer, and at least one pocket or ring in the cladding layer for disposing the active material. Another step 124 of the method 120 is to taper at least a portion of the optical device. Another step 126 of the method 120 is to dispose the active material in the pocket(s) or ring(s) formed in the cladding layer. According to embodiments of the invention, the active material is disposed in the pockets after the optical device has been drawn from a preform. According to alternative embodiments of the invention, the active material is formed in the preform, i.e., before the optical device has been formed. For example, a ring of active material (e.g., erbium) is formed in the preform, then the preform is drawn into an optical fiber device.

Thus, according to embodiments of the invention, the step 126 of disposing the active material in the pocket(s) or ring(s) is performed either before or after the step 122 of forming the optical fiber device. Also, according to embodiments of the invention, the step 126 of disposing the active material in the fiber device is performed either before or after the step 124 of tapering a portion of the device.

It will be apparent to those skilled in the art that many changes and substitutions can be made to the embodiments of the optical fiber devices herein described without departing from the spirit and scope of the invention as defined by the appended claims and their full scope of equivalents.

What is claimed is:

1. An optical fiber device, comprising:
   a length of optical fiber having a core region and a cladding layer formed around the core region, the length of optical fiber having a first diameter,
   wherein the cladding layer has at least one pocket formed therein,
   wherein at least a portion of the length of optical fiber includes a tapered region having a second diameter less than the first diameter; and
   an active material disposed in the at least one pocket in at least a portion of the cladding layer in the tapered region, wherein the active material is capable of changing its optical properties in such a way that it varies the propagation properties of optical signals in the length of optical fiber.

2. The optical fiber device as recited in claim 1, further comprising at least one annular ring formed in the cladding layer, and wherein the active material is disposed in the at least one annular ring.

3. The optical fiber device as recited in claim 1, wherein the active material further comprises an electro-optic material, wherein the electro-optic material has an index of refraction that changes in response to changes in electric field, and wherein the at least one pocket is formed in the cladding in such a way that changes in the index of refraction of the electro-optic material vary the propagation properties of optical signals propagated in the optical device.

4. The optical fiber device as recited in claim 1, wherein the active material further comprises a magneto-optic material, wherein the magneto-optic material has an index of refraction that changes in response to changes in a magnetic field, and wherein the at least one pocket is formed in the cladding in such a way that changes in the index of refraction of the magneto-optic material vary the propagation properties of optical signals propagated in the optical device.

5. The optical fiber device as recited in claim 1, wherein the active material further comprises a thermo-optic material, wherein the thermo-optic material has an index of refraction that changes in response to changes in temperature, and wherein the at least one pocket is formed in the cladding in such a way that changes in the index of refraction of the thermo-optic material vary the propagation properties of optical signals propagated in the optical device.

6. The optical fiber device as recited in claim 1, wherein the active material further comprises a photorefractive material, wherein the photorefractive material has an index of refraction that changes in response to exposure to light at a given wavelength, and wherein the at least one pocket is formed in the cladding in such a way that changes in the index of refraction of the photorefractive material vary the propagation properties of optical signals propagated in the optical device.

7. The optical fiber device as recited in claim 1, wherein the active material further comprises a gain medium, and wherein the optical device amplifies optical signals propagated in the optical device.

8. The optical fiber device as recited in claim 7, wherein the gain medium further comprises dye laser.

9. The optical fiber device as recited in claim 1, wherein the core region and the cladding layer are configured in such a way that changing optical properties of the active material affects the propagation properties of optical signals in the tapered region and does not affect the propagation properties of optical signals not in the tapered region.

10. The optical fiber device as recited in claim 1, wherein the index of refraction of the active material changes from a first value greater than the index of refraction of the core region to a second value less than the index of refraction of the core region.

11. A method for making an optical device, comprising the steps of:
    forming a length of optical fiber having a core region, a cladding layer formed around the core region, and at least one air void in the cladding layer the length of optical fiber having a first diameter;
    tapering at least a portion of the length of optical fiber to form a tapered region having a second diameter less than the first diameter; and
    disposing an active material capable of changing its index of refraction in the at least one air void in the cladding layer in the tapered region,
    wherein the active material is disposed in the cladding layer in such a way that changes in the index of refraction of the material vary the propagation properties of optical signals propagated in the optical device.

12. The method as recited in claim 11, wherein the air void forming step further comprises forming a plurality of axially-disposed air voids formed radially about the core region.

13. The method as recited in claim 11, wherein the air void forming step further comprises forming at least one annular ring in the cladding layer.

14. The method as recited in claim 11, wherein the disposing step further comprises disposing the active material in the at least one air void before performing the forming step.

15. The method as recited in claim 11, wherein the active material disposing step further comprises disposing an electro-optic material in the at least one air void, wherein the electro-optic material has an index of refraction that changes in response to changes in electric field, and wherein changes in the index of refraction of electro-optic material vary the propagation properties of optical signals propagated in the optical device.

16. The method as recited in claim 11, wherein the active material disposing step further comprises disposing a magneto-optic material in the at least one air void, wherein the magneto-optic material has an index of refraction that changes in response to changes in a magnetic field, and wherein changes in the index of refraction of the magneto-optic material vary the propagation properties of optical signals propagated in the optical device.

17. The method as recited in claim 11, wherein the active material disposing step further comprises disposing a thermo-optic material in the at least one air void, wherein the thermo-optic material has an index of refraction that changes in response to changes in temperature, and wherein changes in the index of refraction of the thermo-optic material vary the propagation properties of optical signals propagated in the optical device.

18. The method as recited in claim 12, wherein the active material disposing step further comprises disposing a photorefractive material in the at least one air void, wherein the photorefractive material has an index of refraction that changes in response to exposure to light at a given wavelength, and wherein changes in the index of refraction of the photorefractive material vary the propagation properties of optical signals propagated in the optical device.

19. A system for transmitting optical information, comprising:
    at least one source of optical energy;
    an optical cable coupled to the source for transmitting optical energy from the source; and
    a receiver coupled to the optical cable for receiving optical energy from the source,
    wherein the optical cable includes at least one length of optical fiber having
        a core region,
        a cladding layer formed around the core region, the cladding layer having at least one pocket formed therein,
        wherein the length of optical fiber has a first diameter, and
        wherein at least a portion of the optical fiber includes a tapered region having a second diameter less than the first diameter, and
        an active material disposed in the at least one pocket, the active material capable of changing its refractive index in such a way that it varies the propagation properties of optical information propagating in the optical fiber.

20. The system as recited in claim 19, wherein the at least one pocket further comprises a plurality of pockets formed radially about the core region.

21. The system as recited in claim 19, wherein the at least one pocket further comprises at least one annular ring formed in the cladding layer.

22. The system as recited in claim 19, wherein the active material further comprises an electro-optic material, wherein the electro-optic material has an index of refraction that changes in response to changes in electric field, and wherein the at least one pocket is formed in the cladding in such a way that changes in the index of refraction of the electro-optic material vary the propagation properties of optical signals propagated in the optical device.

23. The system as recited in claim 19, wherein the active material further comprises a magneto-optic material, wherein the magneto-optic material has an index of refraction that changes in response to changes in a magnetic field, and wherein the at least one pocket is formed in the cladding in such a way that changes in the index of refraction of the magneto-optic material vary the propagation properties of optical signals propagated in the optical device.

24. The system as recited in claim 19, wherein the active material further comprises a thermo-optic material, wherein the thermo-optic material has an index of refraction that changes in response to changes in temperature, and wherein the at least one pocket is formed in the cladding in such a way that changes in the index of refraction of the thermo-optic material vary the propagation properties of optical signals propagated in the optical device.

25. The system as recited in claim 19, wherein the active material further comprises a photorefractive material, wherein the photorefractive material has an index of refraction that changes in response to exposure to light at a given wavelength, and wherein the at least one pocket is formed in the cladding in such a way that changes in the index of refraction of the photorefractive material vary the propagation properties of optical signals propagated in the optical device.

* * * * *